(12) United States Patent
Korenaga et al.

(10) Patent No.: US 6,314,228 B1
(45) Date of Patent: Nov. 6, 2001

(54) OPTICAL WAVEGUIDE COMPONENT AND A METHOD OF PRODUCING THE SAME

(75) Inventors: Tsuguhiro Korenaga, Neyagawa; Hiroyuki Asakura, Osaka; Hideo Kurokawa, Katano, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/240,693

(22) Filed: Feb. 2, 1999

(30) Foreign Application Priority Data

Feb. 2, 1998 (JP) .................................. 10-020929
Jul. 7, 1998 (JP) .................................. 10-191883

(51) Int. Cl.⁷ ........................................ G02B 6/10
(52) U.S. Cl. ........................ 385/129; 385/83; 385/131
(58) Field of Search ........................... 385/14, 51, 52, 385/83, 88, 129, 131, 132

(56) References Cited

U.S. PATENT DOCUMENTS

| 4,756,627 | 7/1988 | Nelson . |
| 5,201,018 | 4/1993 | Coden et al. . |
| 5,343,544 | 8/1994 | Boyd et al. . |
| 5,473,721 | 12/1995 | Myers et al. . |
| 5,594,824 | 1/1997 | Kerndlmaier . |
| 5,858,051 | 1/1999 | Komiyama et al. . |

FOREIGN PATENT DOCUMENTS

| 0 052 901 | 6/1982 | (EP) . |
| 0 608 566 | 8/1994 | (EP) . |
| 0 649 039 | 4/1995 | (EP) . |
| 8-320420 | 12/1996 | (JP) . |
| 2598025 | 1/1997 | (JP) . |
| WO 96/21875 | 7/1996 | (WO) . |

OTHER PUBLICATIONS

Kawauchi, "Optoelectronics, " No. 8, 1998, pp. 85—87. (partial translation attached) (No Month).
Patent Abstracts of Japan, No. 59208509 dated Nov. 1984.
Patent Abstracts of Japan, No. 05157640 dated Jun. 1993.
Japan abstract 4154635 dated Oct. 1990.
Patent Abstracts of Japan, No. 58149008 to Kodera Kohei, dated Sep., 1983.
Patent Abstracts of Japan, No. 06118465 to Fujita Yuriko, dated Apr., 1994.

*Primary Examiner*—James Phan
(74) *Attorney, Agent, or Firm*—Smith, Gambrell & Russell, LLP

(57) ABSTRACT

An optical waveguide component has a first optical member in which a predetermined first core pattern groove is formed and a second optical member in which a predetermined second core pattern groove is formed, the first and second optical members being combined together so that said first and second core pattern grooves are opposingly overlapped with each other, and the first and second core pattern grooves being filled with a core material.

10 Claims, 11 Drawing Sheets

(a)

(b)

OPTICAL WAVEGUIDE COMPONENT AND A METHOD OF PRODUCING THE SAME

BACKGROUND OF THE INVENTION

1. Field of the Invention

The invention relates to a component of an optical circuit which is based on an optical waveguide used in optical communication, an optical sensor or the like, and also to a method of producing the component.

2. Related Art of the Invention

In the fields of optical communication and an optical sensor, research and development of an optical circuit having various functions are vigorously conducted in order to realize sophisticated optical signal processing or sensing. An optical circuit uses an optical waveguide through which light passes, as a fundamental element. In an optical waveguide, a core region having a higher refractive index is disposed in a clad having a low refractive index, thereby confining light into the core region so as to propagate therethrough. When a core is patterned, various functions can be realized. In the specification, a configuration in which an optical waveguide is patterned in a manner like an electric circuit is defined as an optical circuit.

Hereinafter, an example of an optical circuit used in optical communication will be described in detail.

FIG. 10 is a schematic section view of a usual quartz single-mode optical waveguide. A core 101 has a square section shape having a side of 8 $\mu$m, and is covered by a quartz clad 102. Light propagates in the direction of the arrow X.

In FIG. 11, (a) to (c) show a method of producing an optical waveguide which is used most commonly in the prior art (for example, Kawachi, "Optoelectronics" No. 8, p. 85, 1988). The production process includes the following steps.

(a) A core film 112 made of $SiO_2$ doped with, for example, Ge is formed on the surface of a quartz substrate 111 serving also as a lower clad layer, by the flame deposition method (FIG. 11(a)). When a substrate other than a quartz substrate is used, a lower clad layer is previously formed on the substrate by the flame deposition method, and the core film 112 is then formed on the layer.

(b) The core film 112 is patterned into a predetermined pattern by using the photolithography or dry etching technique, thereby forming a core portion 112a (FIG. 11(b)).

(c) Finally, an upper clad layer 113 is formed by the flame deposition method to cover the core portion 112a (FIG. 11(c)).

According to this method, an optical waveguide of a low loss can be produced so that a complicated optical circuit is realized. Also methods in which the CVD method or the vapor deposition method is used as a film deposition method are under investigation.

Recently, such an optical waveguide device is more strongly requested to be produced at a low cost and in mass production.

In the field of optical communication, as typically exemplified by FTTH (Fiber To The Home), an optical fiber is being extended from a trunk line to a subscriber's line. Therefore, it is required to produce a photoelectric conversion module which is based on an optical waveguide, in mass and at a low cost.

The prior art method of producing an optical waveguide such as shown in FIGS. 11(a) to 11(c) has an advantage that even a complicated optical circuit of high performance can be produced. However, a long tact time is necessary for the film forming and heating processes because the core and the clad are produced by a thin film forming process. Furthermore, the photolithography or dry etching technique which is used in the patterning of the core requires many complicated steps. Consequently, although the method is suitable for production of an optical circuit of high performance and high added value, such as an array waveguide grating, it cannot say that the method is suitable for production of a simple optical circuit such as a Y-branch splitter.

In order to solve the problems in production of an optical waveguide, various ideas have been proposed. For example, one of potential processes is press molding. Press molding is proposed in Japanese Patent Publication (Kokai) Nos. HEI8-320420 and 1-26806, etc. As shown in FIGS. 12(a) to 12(c), a desired core pattern 120a is formed in a die 120, and the die is pressed against a base material (a first glass substrate 121) serving also as a lower clad at a high temperature (FIG. 12(a)). The first glass substrate 121 is taken out from the die 120, an ultraviolet curing resin 123 is applied to the surface and filled into a core portion 123a (FIG. 12(b)), and a second glass substrate 122 is stuck to the first glass substrate and the resin is then irradiated with ultraviolet rays to be cured. Thus core pattern grooves are formed in one operation (FIG. 12(c)). According to this method, a mass production is enabled, and the photolithography or dry etching step which is used in the prior art can be omitted, and a core can be easily formed by filling a resin. Therefore, this is seemed to be a hopeful process of producing an optical waveguide.

According to study of the inventors, however, it has been proved that the method of FIGS. 12(a) to 12(c) has the following drawbacks. When a glass material is subjected to press molding by using a die having a core pattern of a square section which has a side of about 8 $\mu$m, large concentrated stress is applied to the core pattern portion because the aspect ratio of the vertical and lateral sides of the section of the core groove is large. Consequently, the die is easily broken, so that the die must be frequently replaced with a new one. When a glass material having a coefficient of thermal expansion which is largely different from that of a die is subjected to press molding, large thermal stress acts so as to tighten the pattern in the die, thereby lowering the release property between the die and the glass material. As a result, it is difficult to realize a satisfactory pattern transfer.

Furthermore, the production of a die used in press molding has the following problem.

Conventionally, a glass lens is known as an example of an optical component which is produced by using press molding. In a die for forming a glass lens, a hard alloy such as WC is mainly used as the base material, and a desired surface pattern is obtained by means of machining such as cutting or polishing.

As described above, a core of an optical waveguide has a rectangular section shape having a side of about 8 $\mu$m. It is very difficult to produce such a shape by means of machining, because a cutting tool must usually have a radius diameter of 10 $\mu$m or more. In machining, a linear core pattern can be formed, but it is very difficult to realize a branched pattern or a smoothly bent pattern.

On the other hand, etching is known as a production method other than machining. In etching, a complicated core pattern can be obtained, but, usually, a material of high mechanical strength is hardly etched. A hard alloy is not an exception to the above. When etching which is deeper than 5 $\mu$m is to be performed, an etching mask must have a very complicated configuration. Furthermore, there is another problem in that the surface is roughened as a result of etching, and, even when the surface is smoothed by polishing, an edge of a section of the pattern is rounded, with a result that an optical waveguide of high performance can be hardly obtained.

SUMMARY OF THE INVENTION

It is an object of the invention to provide an optical waveguide component which can be produced by a molding method of high productivity and without applying a large burden to a die, and can be accurately positioned with respect to an optical fiber or an active device in an easy manner and in mass, and a method of producing the optical waveguide component.

In the optical waveguide component of the invention, first and second optical members are stuck together to form an optical waveguide, and the optical members can be used as a platform (substrate) on which a device is to be mounted. In other words, a stage on which a light emitting device and a light receiving device are to be mounted are disposed in one of the first and second optical members. When sufficient relative positional accuracy is attained between the optical waveguide and the stage, positioning between the optical waveguide and the light emitting device or the light receiving device can be correctly performed. As a result, an optical transmission/reception module of a low optical loss can be realized.

In the optical waveguide component, the optical members are preferably made of glass. In this example, since a glass material is excellent in environmental resistance, heat resistance, and mechanical strength, it is possible to realize an optical waveguide component of high reliability.

In the optical waveguide component, preferably, the first and second optical members are configured by a combination of materials which are different in coefficient of thermal expansion from each other by $30 \times 10^{-7}/°$ C. or more. In this example, when the ambient temperature is changed, internal stress is generated owing to the difference in coefficient of thermal expansion between the members, and birefringence is induced in the optical waveguide, with the result that the polarization state of light propagating through the optical waveguide is sensitively changed. When the polarization state of light is observed, therefore, the optical waveguide component can be used as a temperature sensor.

In the optical waveguide component, preferably, a face of the optical member in which a core pattern groove is formed is not perpendicular to a side face in an end portion of the core pattern groove. According to this configuration, the direction of the light guidance by an optical fiber is made coincident with that of the optical waveguide. Even in the case where, when light enters the optical waveguide, light is reflected by the side face, therefore, it is possible to prevent the reflected light from returning toward the optical fiber. As a result, a signal noise is prevented from occurring.

In the optical waveguide component, the optical members are preferably provided with a positioning marker. In this example, grooves of the optical waveguide can be accurately positioned by making the markers respectively formed on the members, coincident with each other.

In the optical waveguide component, preferably, a recess is formed in one of the first and second optical members, and a projection having the same pattern as the recess is formed on the other member. In this example, when the recess and the projection respectively disposed in the members are fitted with each other, grooves of the optical waveguide can be accurately positioned.

In the optical waveguide component, preferably, section shapes of grooves respectively formed in the first and second optical members are symmetrical about the sticking face. Particularly, the optical waveguide has a circular or square section shape when the groove patterns are vertically combined with each other. In this case, a groove of one side has a section shape of a semicircle or a rectangular equilateral triangle. The reason of the above is as follows. In order to eliminate a difference in polarization property among waveguides, a core having a symmetric section shape is suitable. From the viewpoint of press molding, it is preferable to form a section pattern in which concentrated stress is not applied to a fine shape portion of a die.

A first method of producing an optical waveguide component according to the invention is characterized in that a predetermined core pattern groove is formed in surfaces of first and second optical members by means of press molding, a material of a high refractive index is sandwiched between the first and second optical members, and the material of a high refractive index is cured to be formed into a core layer. Since a core pattern groove is formed by a molding process, substrates having grooves of the same pattern can be produced in mass by a die. This is advantageous in production cost.

A second method of producing an optical waveguide component according to the invention is characterized in that a predetermined core pattern groove is formed in surfaces of first and second optical members by means of press molding, the first and second optical members are directly bonded to each other, and a material of a high refractive index is then filled into a cavity of the core pattern by means of capillarity. When such a method is employed, no air bubble is formed in the core, and hence an optical waveguide component of high performance can be produced. When a liquid is used as a core material and the end portions are sealed, the liquid can be easily filled into the core.

In the first production method, preferably, the material of a high refractive index is at least one resin selected from the group consisting of an ultraviolet curing resin and a thermosetting resin. In this example, the resins may be an epoxy resin or an acrylic resin.

In the second production method, preferably, a liquid is used as the material of a high refractive index and, after filling into the cavity, ends of the core pattern are sealed. In this example, a liquid of a viscosity of 10 cps or less may be used. For example, an ultraviolet curing resin containing silicone modified oligomer, a polyamide acid solution of fluorinated polyimide, or cyclohexane monomer, or a mixed liquid of benzene and decalin may be used.

In the first and second production methods, preferably, the predetermined core pattern groove is formed in the surfaces of the first and second optical members by means of press molding using a molding die in which the base material mainly contains diamond or diamond-like carbon. Diamond or diamond-like carbon is a material which can realize a die of high mechanical strength and excellent durability. When dry etching is performed by using an etching gas which mainly contains oxygen, diamond or diamond-like carbon can be etched at a high rate, and the resulting worked face is very smooth. Therefore, a pattern which is fine and deep can be correctly formed in the surface of the die.

In the first and second production methods, preferably, section shapes of grooves respectively formed in the first and second optical members are symmetrical about the sticking face.

As described above, in the optical waveguide component of the invention, the core can be formed by means of press molding, and hence the optical waveguide component can be simply produced and easily connected with an optical fiber. Therefore, it is possible to realize a waveguide device which is high in productivity and low in production cost. According to the invention, moreover, not only a passive device but also an active device such as a temperature sensor can be easily realized.

BRIEF DESCRIPTION OF THE DRAWINGS

FIG. 1(b) is a section view taken along the line I—I of (a);

Figure 1:
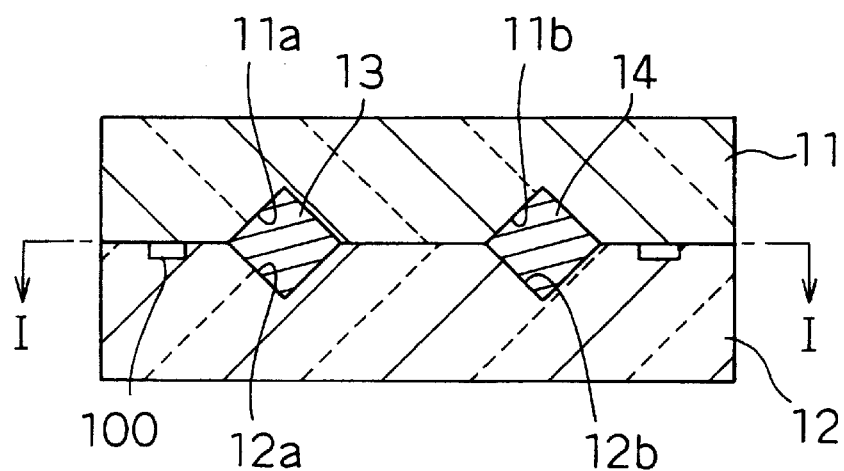
FIG. 1 shows the structure of an optical waveguide component of Embodiment 1 of the invention, and (a) is a section view taken along a direction perpendicular to the longitudinal direction.
Figure 1:
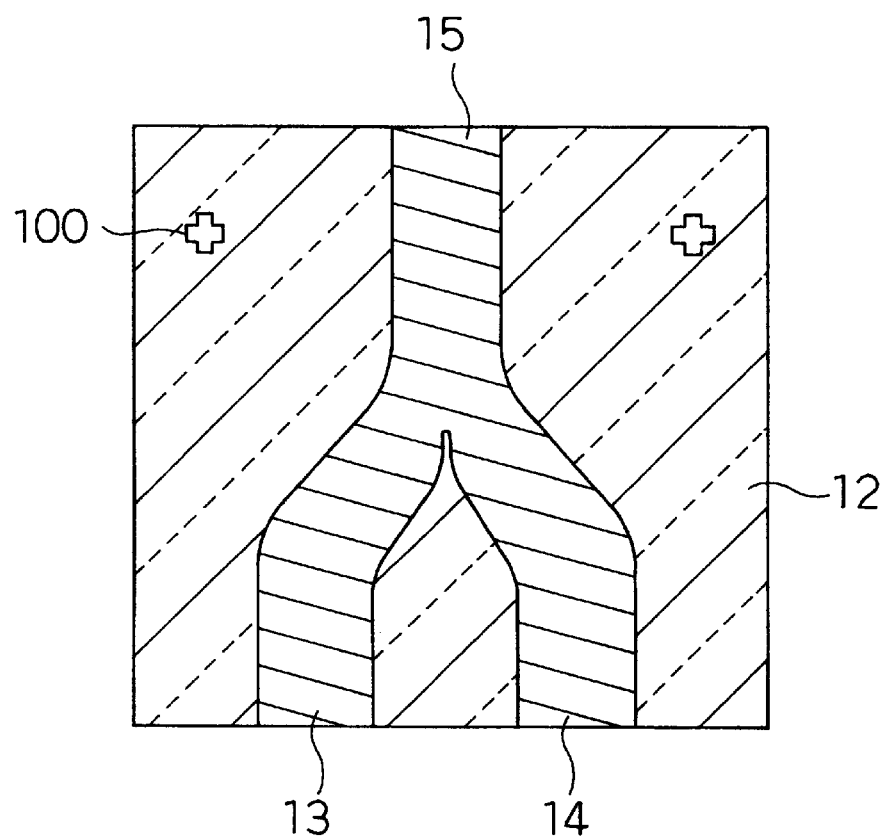

LEGEND OF THE REFERENCE NUMERALS 20, 50, 120 die
20a groove pattern
21, 31, 51, 121 first glass substrate
22, 32, 52, 122 second glass substrate
23, 123 ultraviolet curing resin
23a, 33, 53, 73 core portion
24 optical fiber having ball-shaped end
34 end face of first glass substrate
41 base substrate
42 first optical waveguide groove substrate
43 second optical waveguide groove substrate
44 wavelength splitting filter
45a optical fiber of a trunk line
45b optical fiber for outputting a video signal
46 photodiode
47 laser
48 electronic circuit
49 electrode
61 Si substrate
62 diamond film
63 amorphous Si film
64 photoresist
65 metal film
71 borosilicate glass substrate
72 zinc crown glass substrate
81 input light port
82, 83 optical path
84 output light port
85 glass substrate
101 core
102 quartz clad
X propagation direction of light
111 quartz substrate
112 core film
112a core portion
113 upper clad film
120 die
121 first glass substrate
122 second glass substrate
123a core portion

PREFERRED EMBODIMENTS OF THE INVENTION

Hereinafter, the invention will be described more specifically by means of embodiments.

(Embodiment 1)

An optical waveguide component of Embodiment 1 of the invention has a basic configuration shown in FIG. 1(a) (section view) and FIG. 1(b) (section view taken along the line I—I of FIG. 1(a)). The optical waveguide component is configured by sticking a first substrate (first optical component) 11 having first core pattern grooves 11a and 11b, and a second substrate (second optical component) 12 having second core pattern grooves 12a and 12b to each other. The first and second core patterns 11a and 11b, and 12a and 12b have a fundamentally same shape.

Any optically transparent material may be used as the material of the substrate. Specifically, quartz glass, $LiNbO_3$, $LiTaO_3$, ZnO, PLZT, a metal oxide ($Ta_2O_5$, $Nb_2O_5$, or the like), organic polymer, or the like may be used.

Next, a specific method of producing the optical waveguide component of FIG. 1 will be described by way of an example using glass as a substrate, with reference to FIGS. 2(a) to 2(d).

Figure 2:
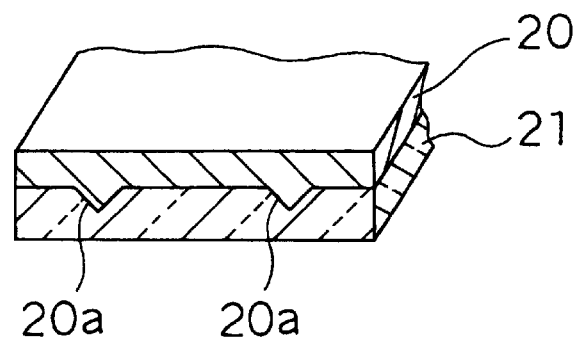
FIG. 2 shows a production process of the optical waveguide component of Embodiment 1 of the invention, and (a) shows a step of forming a core groove in a first glass substrate by means of press molding, (b) shows a step of applying an ultraviolet curing resin to the surface of the glass substrate and curing the resin, (c) shows a step of sticking a second glass substrate and connecting an optical fiber, and (d) is a section view showing the step and taken along the line II—II of (c)
Figure 2:
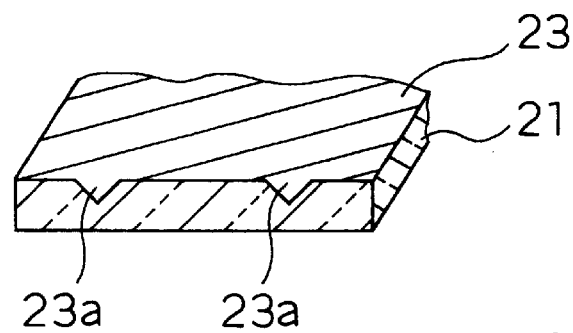
Figure 2:
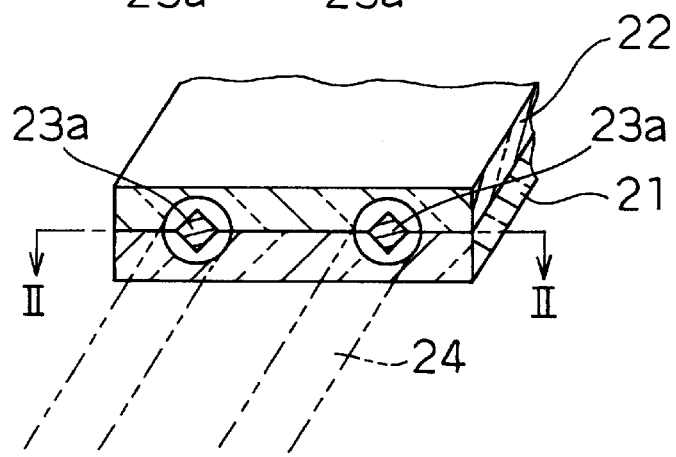
Figure 2:
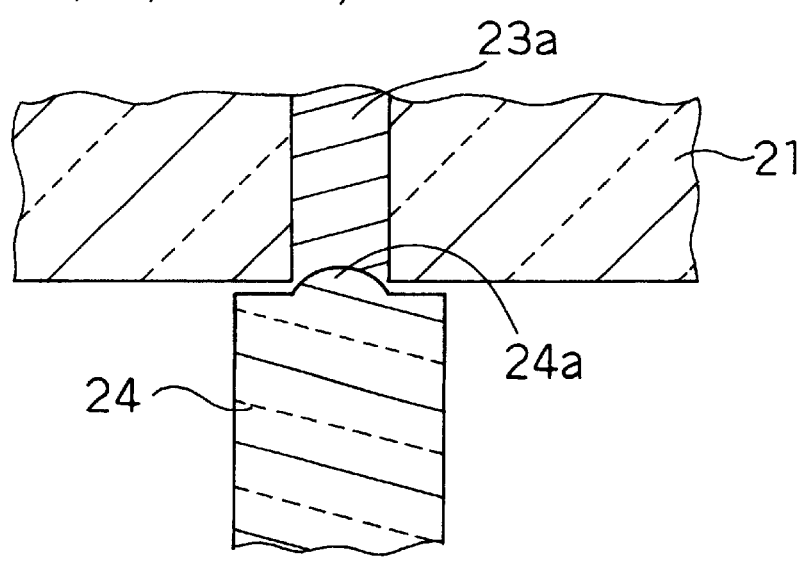

Referring to FIG. 2(a), desired core pattern grooves 20a for an optical waveguide was formed in a glass substrate 21 by means of press molding. The press molding was performed by the steps which are fundamentally identical with those of a conventional process of forming aspherical glass. As the base material of a die 20, used was a material which is hardly deformed and has high breaking strength, such as a hard alloy, zirconia, cermet, or silicon carbide. The base material was processed so as to leave the desired core pattern 20a. The process was performed by the dry etching technique. Depending on the kind of the core pattern, machining or the like may be performed. After the processing, a noble metal alloy film was formed as a protective film on the surface of the base material by sputtering, thereby completing the die.

Figure 10:
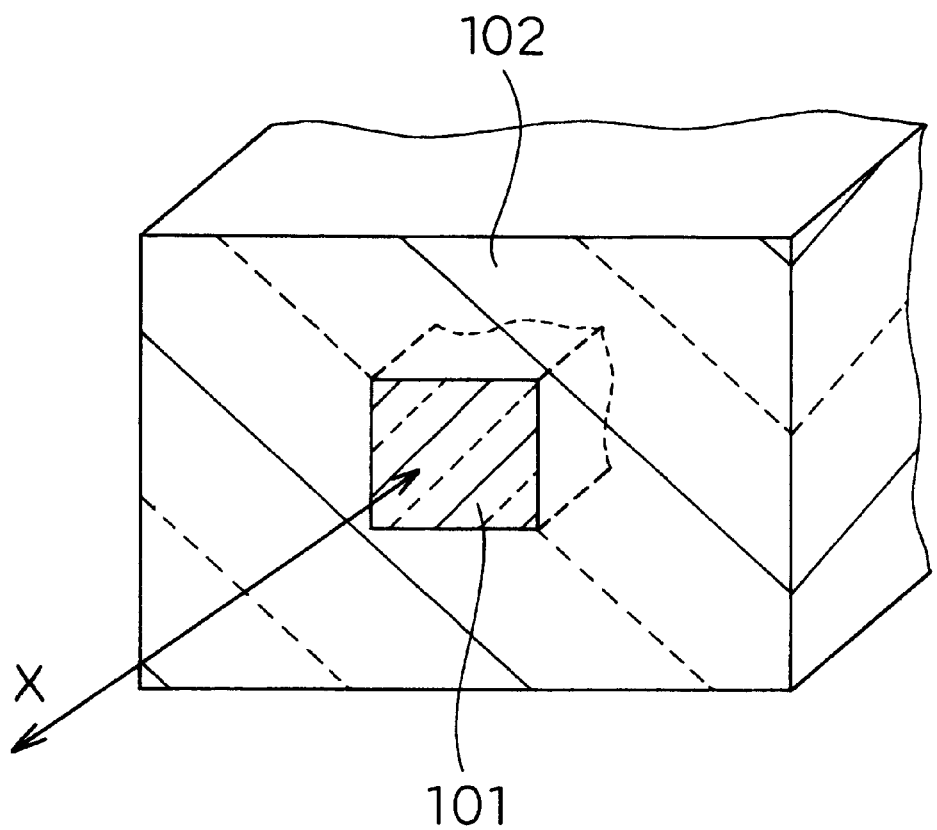
FIG. 10 is a schematic section view of a usual quartz single-mode optical waveguide of the prior art.

The press molding was performed in the following procedure. The die 20 and the glass substrate 21 (in the embodiment, #700 was used) were set in a press molding machine (not shown), and the die was pressed against the glass substrate while heating the die to about 650° C., thereby transferring the groove pattern 20a onto the glass. A section of the groove has a shape of a rectangular equilateral triangle, and each equilateral side has a length of 8 $\mu$m. In the die of the prior art which is used in the formation of the groove of FIG. 10, the groove must have a depth of 8 $\mu$m. By contrast, in the configuration described above, the maximum height of the core pattern portion is about 5.7 $\mu$m (8/root 2), or a shallow pattern may be used. In addition to the core pattern, a marker pattern 100 (see FIG. 1) for alignment is formed in the die, so that a marker pattern can be formed on the glass substrate during the press molding.

With respect to a section shape of the core pattern groove, preferably, the upper and lower groove section shapes are symmetrical about the sticking face. Particularly, it is most preferable that the groove has a section shape of a semicircle or a rectangular equilateral triangle which, when the groove patterns are vertically combined, allows the final core section to have a symmetrical shape such as a circle or a square. The reason of the above is as follows. In order to eliminate a difference in polarization property among waveguides, a core having a symmetric section shape is suitable. From the viewpoint of press molding, it is preferable to form a section pattern in which concentrated stress is not applied to a fine shape portion of the die.

The same groove pattern as that of the glass substrate 21 was transferred to a glass substrate 22 shown in FIG. 2(c), in the strictly same method as described above. In this transfer, it is not always required to use the same die as that used in molding of the glass substrate 21, and any die may be used as far as the same core pattern grooves are formed in a part of the die.

Next, an ultraviolet curing resin 23 (an epoxy resin (product in which the refractive index is adjusted) produced by NTT Advanced Technology Corporation) which is higher in refractive index than the glass substrate 21 or 22 was applied to the groove pattern formation face of the glass substrate by the spin coating method, and filled into the grooves, thereby forming core portions 23a (FIG. 2(b)). The resin has both the function of adhesion and that of a core. As the resin, a resin material which has a viscosity of 100 cps or less and fluidity at room temperature is preferably used. Thereafter, the other glass substrate was stuck while the ambient pressure is reduced to about 100 torr. During this sticking process, spherical portions 24a at the ends of optical fibers 24 were connected to an end of the optical waveguide formed by stacking the upper and lower core pattern grooves 20a so that the spherical portions are vertically clamped as shown in FIG. 2(d).

The glass substrates 21 and 22 were subjected to positioning of a level of ±1 $\mu$m by using the markers formed on the substrates, and then provisionally fixed. Thereafter, the resin was cured by irradiation of ultraviolet rays and the optical waveguide component was completed (FIGS. 2(c) and 2(d)).

In order to facilitate the positioning, a recess and a projection which have the same pattern were formed on the substrates 21 and 22 (see FIG. 1). The recess and the projection were fitted with each other, so that the positioning was correctly performed. For example, the projection is formed as a pin, and the recess as a hole. In this case, sufficient positioning accuracy was obtained. It was possible to form the recess and the projection for positioning simultaneously with the core pattern grooves in the forming step. It was confirmed that the component completed as a result of the above-described production method has sufficient practicality.

The optical waveguide component of Embodiment 1 is produced by using press molding. As compared with the prior art method of producing an optical waveguide component shown in FIG. 11, therefore, the optical waveguide component can be produced more easily and for a shorter period of time. Since the groove of the optical waveguide may have a shallow depth, the burden on the die can be reduced. Furthermore, the groove may have a shape of a semicircle or a triangle, and hence the release property between the die and the glass material can be enhanced. As a result, the life of the die can be prolonged by 10 times or more as compared with that of the die for the press molding of FIG. 12, and the productivity can be enhanced. A glass material of a refractive index of about 1.5 which is suitable for a clad of an optical waveguide has a higher glass yield point that determines the molding temperature, than a glass material of a refractive index of 1.6 or more which is often used in a lens. Therefore, it is difficult to form a deep fine pattern in such a glass material. In the optical waveguide component of the embodiment, even such a glass material can be used.

In an optical waveguide component of the prior art, there is a large problem in connection between an optical fiber and a waveguide core. According to Embodiment 1, high accuracy positioning, which must be performed at plural locations in the prior art, is not necessary. Since an end of an optical fiber is directly embedded into the core groove, a step of polishing an end face which is required in the prior art method in which an optical fiber is connected with an optical waveguide at a later time can be omitted.

When the refractive index of the ultraviolet curing resin is matched with that of the optical fiber to be connected, there is no reflection loss and the coupling loss can be reduced. A block having a V-groove for positioning an optical fiber may be disposed at an end position of the optical waveguide of the substrate, and the optical waveguide may be made coincident with the V-groove. In this configuration, an optical fiber can be stably connected with the optical waveguide. The V-groove can be formed simultaneously with the optical waveguide groove by means of molding.

A long substrate may be prepared, a part of the substrate may be used a terrace for fixing devices, and a positioning marker may be formed on the terrace. According to this configuration, also connection with a laser or a photodiode can be stably performed (see a terrace A in FIG. 4). The terrace can be formed simultaneously with the optical waveguide groove by means of press molding.

Figure 3:
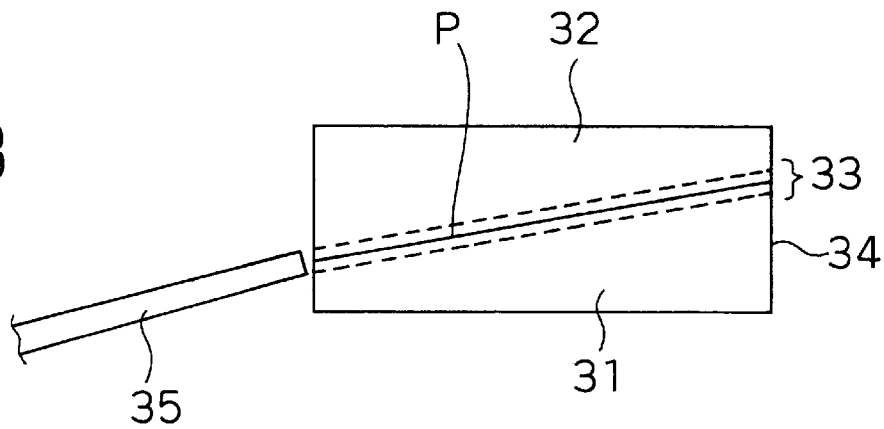
FIG. 3 is a view showing an optical waveguide component using a wedge-like substrate.
Figure 3:
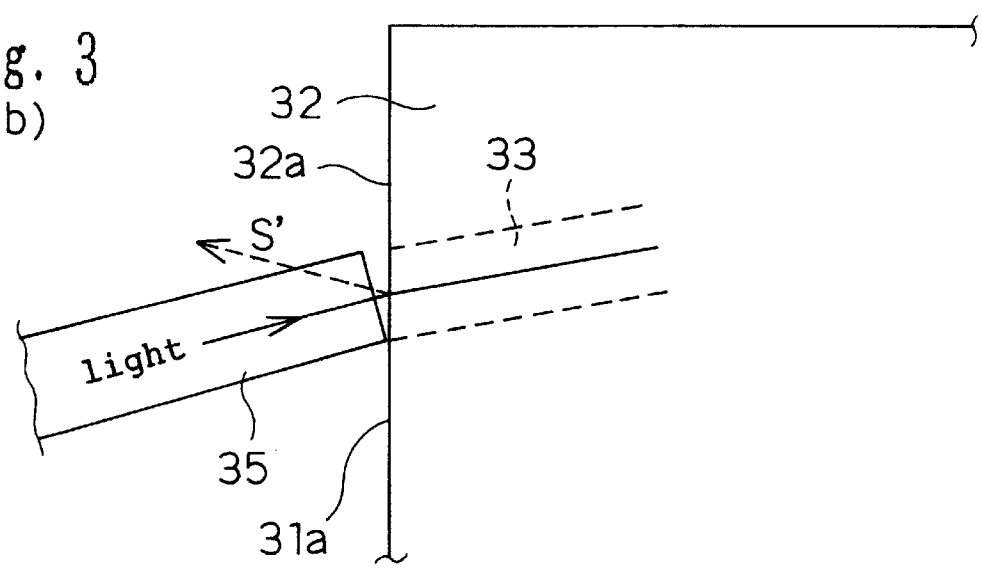

As shown in FIG. 3, glass substrates 31 and 32 may have a shape as follows. The bonding faces P of the glass substrates 31 and 32 in which core pattern grooves are formed, and a side face 32a of the substrate 32 where an end portion of a core pattern groove exists form an angle of about 82 degrees in the drawing. The bonding faces P and a side face 31a of the substrate 31 where an end portion of a core pattern groove exists form an angle of about 98 degrees in the drawing. In other words, the bonding faces P do not perpendicularly intersect with the side faces. When the face in which the core pattern grooves are formed has a taper-like shape and an opposed face of an optical member is provided with an angle of about 8°, the core of the optical waveguide is not perpendicular to the end face of the optical waveguide. As shown in FIG. 3(b), when an optical fiber 35 is connected, therefore, the direction of the optical fiber is made coincident with that of the core 33. Consequently, most of light entering from the optical fiber 35 is transmitted into the core 33 and part of the light is reflected by the side faces 31a and 32a. As indicated by the arrow S, however, the return light due to the end face reflection is not directed toward the optical fiber 35. As a result, light returning to the optical fiber 35 can be suppressed, thereby preventing the high-speed responsibility of the laser from being impaired.

Figure 4:
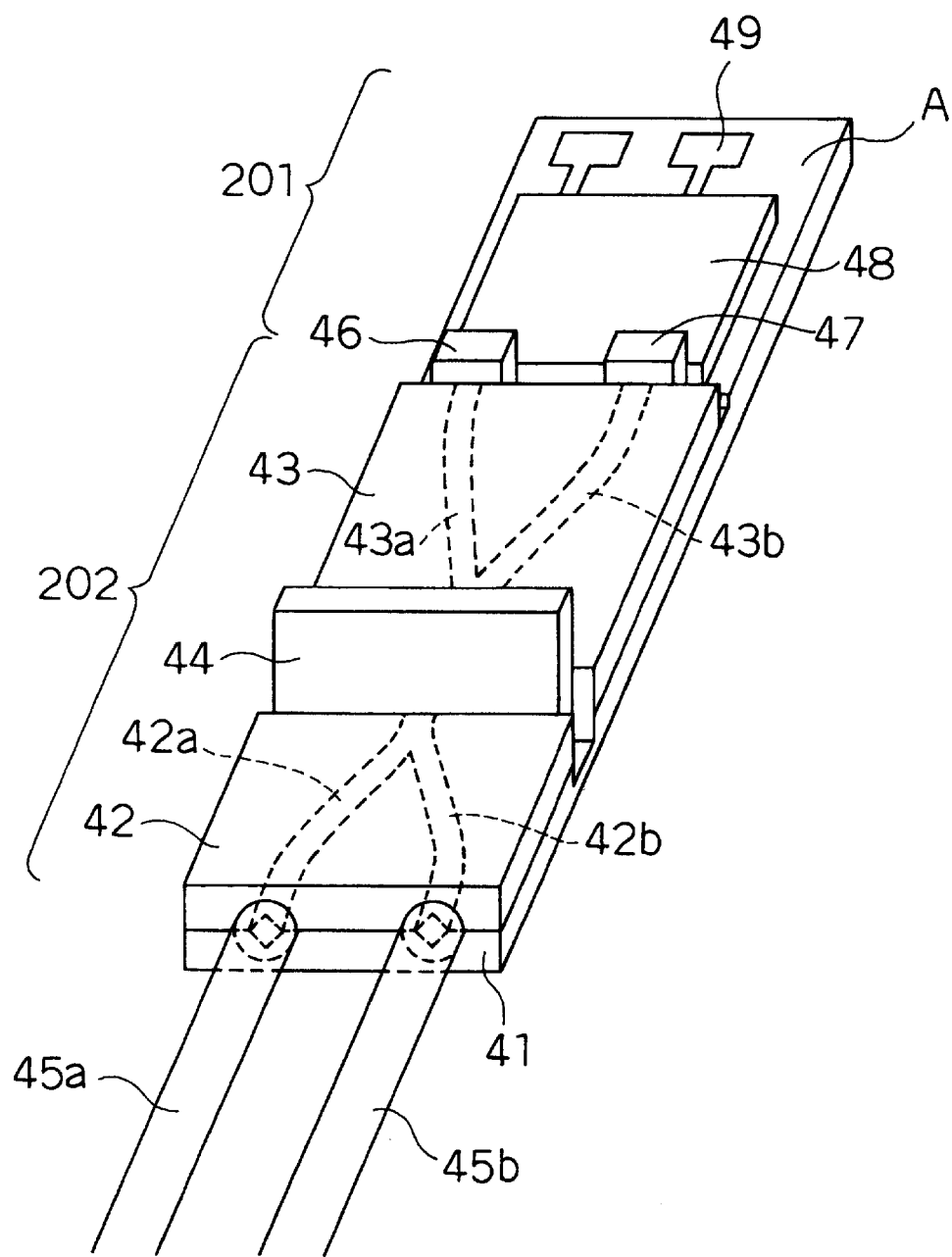
FIG. 4 is a perspective view showing a photoelectric conversion module for a subscriber's line.

FIG. 4 is a view showing the configuration of a photo-electric conversion module for a subscriber's line in FTTH or the like. The module is produced in accordance with the invention.

From an optical fiber 45a of a trunk line, light of a wavelength of 1.3 μm and for performing two-way communication, and that of a wavelength of 1.55 μm and containing a video signal are introduced into the module. The light propagates while being confined in an optical waveguide 42a which is indicated by broken lines in FIG. 4, and reaches a wavelength splitting filer 44. In the wavelength splitting filter 44, the light of a wavelength of 1.55 μm is reflected to enter through an optical waveguide 42b into an optical fiber 45b for outputting a video signal, and then sent to a video signal processing system (not shown).

By contrast, the light of a wavelength of 1.3 μm transmits through the wavelength splitting filter 44, and part of the light reaches a photodiode 46 through an optical waveguide 43a, to be converted into an electric signal. The photodiode is in the reception side of the two-way communication. On the other hand, in the transmission side, the laser 47 is driven with being modulated by a transmission signal, and the emitted light is supplied to the optical fiber 45a of a trunk line through the optical waveguide 43b and the wavelength splitting filter 44, and then sent to the trunk line.

The module is produced in the following procedure.

A base substrate 41 made of glass is configured by an optical waveguide forming portion 202 and an electric device mounting portion 201. A groove which corresponds to the optical waveguide pattern, and a groove into which the wavelength splitting filter 44 is insertedly fixed are formed in the optical waveguide forming portion 202 by means of press molding. A first optical waveguide groove substrate 42 which is made of glass and in which similar core pattern grooves are formed by means of press molding, and a second optical waveguide groove substrate 43 are stuck to the base substrate by an ultraviolet curing resin serving as a core material, thereby configuring the optical waveguides 42a, 42b, 43a, and 43b. In the substrates and the base substrate, a recess and a projection which are used for positioning are formed by means of molding. When the recess and the projection are fitted to each other, correct positioning is enabled. During the process of sticking the first optical waveguide groove substrate 42, ball-ended optical fibers 45a and 45b are sandwiched so as to be connected thereto.

In the electric device mounting portion 201, the base substrate 41 is thickened so as to adjust the level difference between the laser 47 and the photodiode 46, and the optical waveguide cores. After the molding, electrodes 49 for driving the laser and the photodiode, an electric circuit 48, the laser 47, and the photodiode 46 are mounted. With respect to positioning of the laser 47 and the photodiode 46, the terrace for fixing devices (not shown) is previously formed by means of molding, and the positions are restricted by the terrace.

Finally, the wavelength splitting filter 44 is inserted into the groove formed by press molding, and then fixed by a resin, thereby completing the module.

As described above, the optical waveguide component of this configuration can be simply produced and easily connected with an optical fiber, and is suitable for integration with a laser and a photodiode. The optical waveguide component can be applied not only to optical communication but also to all the optical application fields such as an optical sensor and an optical measuring device.

In the production method of the embodiment, glass which has high environmental resistance and excellent transparency was used as the material of a substrate. The material is not restricted to glass. For example, a polymer material such as polymethyl methacrylate or polycarbonate may be used. In this case, the molding process is not restricted to press molding, and molding may be realized by, for example, projection molding or extrusion molding.

In the embodiment, an ultraviolet curing resin was used as the core material. In the case where a heat-resistant substrate is used, a thermosetting resin may be used.

(Embodiment 2)

Another method of producing an optical waveguide component having a basic configuration shown in FIGS. 1(a) and 1(b) will be described with reference to FIGS. 5(a) to 5(c).

Figure 5A:
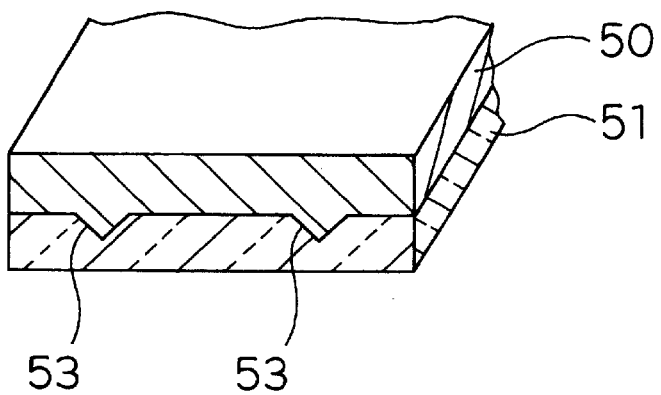
FIG. 5 shows a production process of an optical waveguide component of Embodiment 2 of the invention, and (a) is a view showing a step of press molding, (b) is a view showing a step of directly bonding two substrates to form a cavity, and (c) is a view showing a step of filling a core material.
Figure 5B:
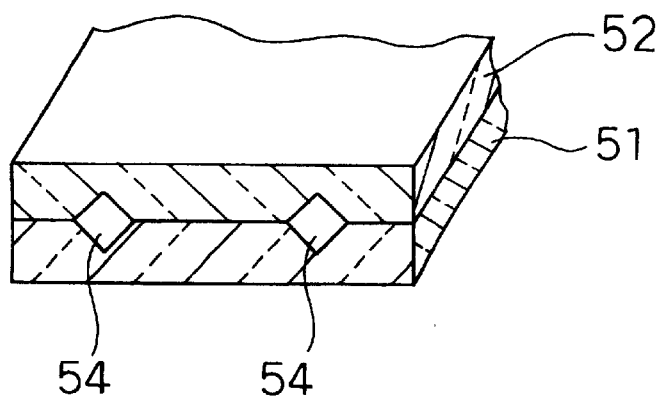
Figure 5C:
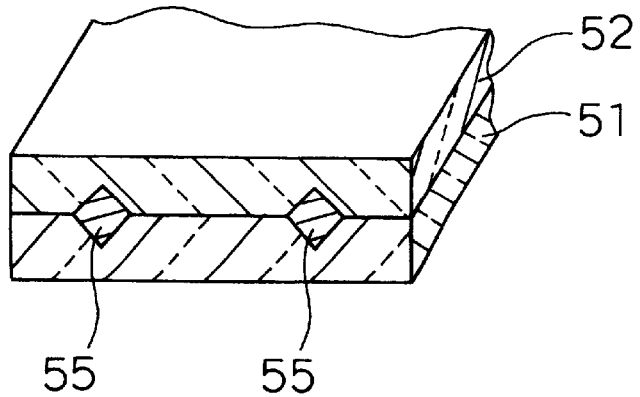

As shown in FIG. 5(a), a die 50 was pressed against a first glass substrate 51 by a press molding machine, to form core pattern grooves 53. This process is identical with that of Embodiment 1 described above, and hence the description of the process is omitted. Two glass substrates in which the same core pattern grooves 53 were formed by molding were positionally adjusted so as to overlap the core pattern grooves 53 with each other, and directly bonded together. In this direct bonding, the glass substrates were contacted with each other at a high temperature and pressurized, to be stuck together. When the glass substrates are directly bonded at 600° C. and a pressure of 300 kgf, the core pattern grooves 53 are overlapped and cavities 54 are formed as shown in FIG. 5(b). In order to facilitate the positioning, a pin and a hole were formed in the substrates, and sufficient positioning accuracy was attained by combining them with each other. The pin and the hole could be formed simultaneously with the core grooves by means of molding.

Next, one end of each cavity 54 was sealed, the other end was immersed into a resin liquid serving as a core material, in the embodiment, a polyamide acid solution of fluorinated polyimide, and the ambient was reduced to the atmospheric pressure. Thereafter, the pressure was gradually returned to the atmospheric pressure. As a result, the core material was filled into the cavities by means of pressure and capillarity. The unsealed end was sealed. The resin liquid was then cured to form core portions 55, thereby completing the optical waveguide component (FIG. 5(c)). The completed component had sufficient practicality.

As the core material, any material having a predetermined refractive index may be used, and a material of a viscosity of 10 cps or less is preferable. For example, an ultraviolet curing resin or a thermosetting resin may be used. The core material is not required to be cured even after the sealing. A liquid can cause air bubbles to be completely removed away from the core cavities. Therefore, a liquid is preferable from the viewpoint of performance.

Figure 11A:
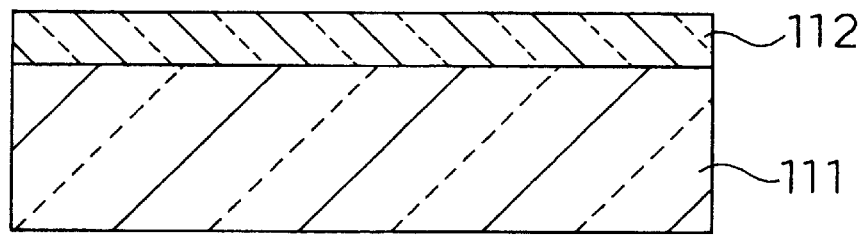
FIG. 11 shows a method of producing a usual optical waveguide of the prior art, (a) shows a step of forming a core film by the flame deposition method, (b) shows a step of patterning the core film into a predetermined pattern by using the photolithography or dry etching technique, and (c) shows a step of forming an upper clad layer by the flame deposition method.
Figure 11B:
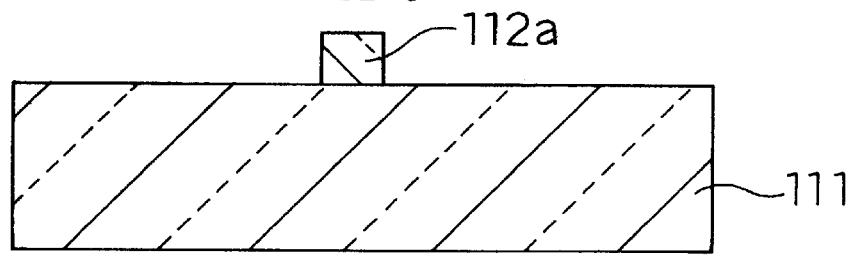
Figure 11C:
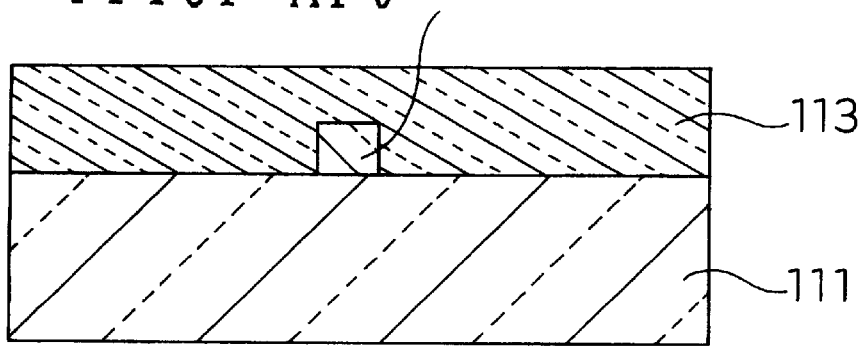
Figure 12A:
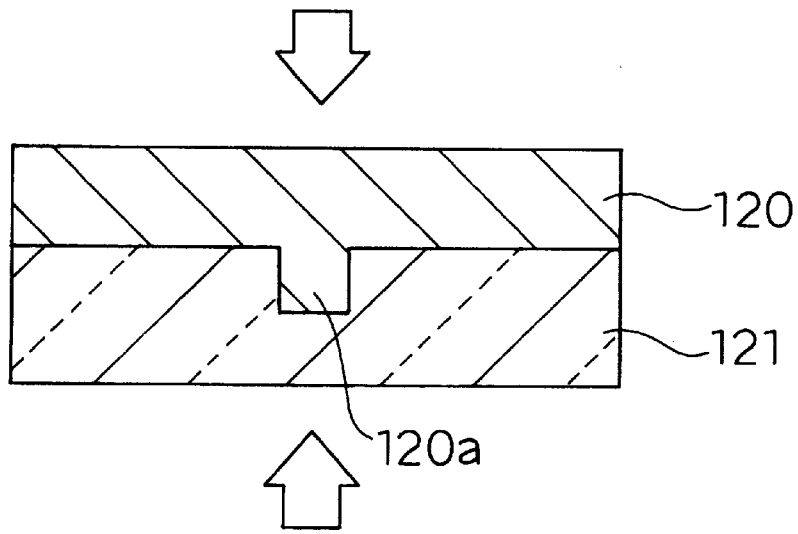
FIG. 12 shows a method of producing an optical waveguide of the prior art by means of press molding, (a) shows a step of pressing a first glass substrate against a die to form a core grave, (b) shows a step of applying an ultraviolet curing resin to the surface of the glass substrate and curing the resin, and (c) shows a step of sticking a second glass substrate to form a core portion.
Figure 12B:
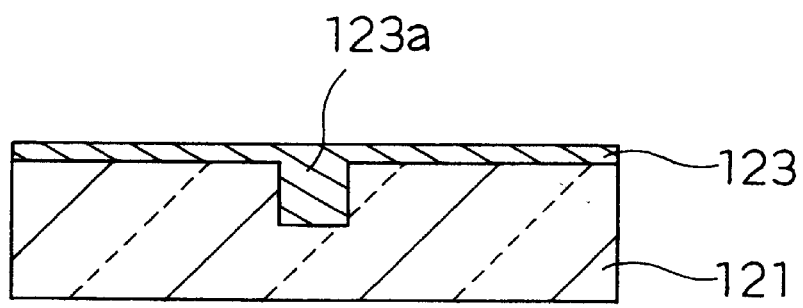
Figure 12C:
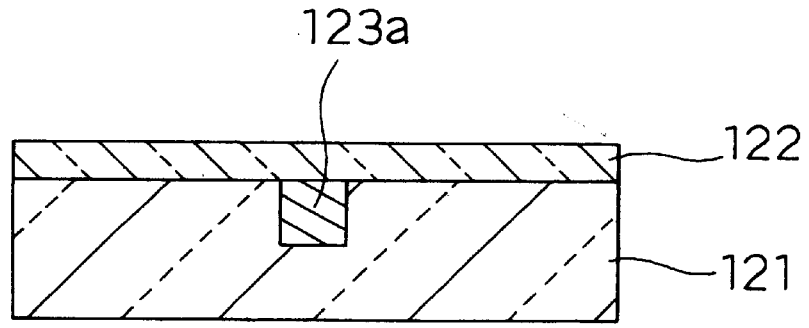

In the method of producing an optical waveguide component in the embodiment, press molding is used, and, as compared with the prior art method of producing an optical waveguide component shown in FIG. 11, an optical waveguide can be produced more easily and for a shorter period of time. Consequently, the method is useful. Since the groove of the optical waveguide may have a shallow depth, the burden on the die can be reduced. Furthermore, the groove may have a shape of a semicircle or a triangle, and hence the release property between the die and the glass material can be enhanced. As a result, the life of the die can be prolonged by 10 times or more as compared with that of the die for the press molding of FIG. 12, and the productivity can be very enhanced. With respect to a section shape of the core pattern groove, preferably, the upper and lower groove section shapes are symmetrical about the sticking face. Particularly, it is most preferable that the groove has a section shape of a semicircle or a rectangular equilateral triangle which, when the groove patterns are vertically combined, allows the final core section to have a symmetrical shape such as a circle or a square. A glass material of a refractive index of about 1.5 which is suitable for a clad of an optical waveguide has a higher glass yield point which determines the molding temperature, than a glass material of a refractive index of 1.6 or more which is often used in a lens. Therefore, it is difficult to form a deep fine pattern in such a glass material. In the optical waveguide component of the invention, even such a glass material can be used.

With respect to connection between an optical fiber and a waveguide core which produces a large problem in an optical waveguide component of the prior art, the configuration in which the end face of the optical waveguide is sealed by using optical fibers having ball-shaped end can eliminate accurate positioning which is required at plural places in the prior art. Since the end of an optical fiber is directly contacted with the core material, it is possible to omit polishing of the end face which is necessary in production of an optical waveguide component of the prior art. When the refractive index of the filled core material is matched with that of the optical fiber to be connected, there is no reflection loss and the coupling loss can be reduced to a very low level.

When a terrace for fixing devices and a positioning marker are formed on the substrate, connection with a laser or a photodiode can be stably performed. The terrace can be formed simultaneously with the optical waveguide grooves by means of press molding. When the core pattern portion of the glass substrate is formed into a wedge-like shape in the thickness direction as shown in FIG. 3, the optical waveguide cores are not perpendicular to the end face of the waveguide, so that return light to the laser which is due to the end face reflection can be suppressed. Therefore, the high-speed responsibility of the laser is not impaired, and this configuration is useful.

In the same manner as Embodiment 1, a module such as shown in FIG. 4 can be produced.

As described above, the optical waveguide component of the embodiment can be simply produced and easily connected with an optical fiber, and is suitable for integration with a laser and a photodiode. The optical waveguide component can be applied not only to optical communication but also to all the optical application fields such as an optical sensor and an optical measuring device.

In the production method of the embodiment, glass which has high environmental resistance and excellent transparency was used as the material of a substrate. The material is not restricted to glass. For example, an organic material such as plastics may be used. In this case, the molding process is not restricted to press molding, and molding may be realized by, for example, projection molding or extrusion molding.

(Embodiment 3)

In the embodiment, a specific example of a method of producing the molding die which was used in Embodiment 1 or 2 will be described. Hereinafter, an example in which diamond was used as a material of the molding die will be described.

FIG. 6 is a section view showing a production procedure of the molding die in which the base material mainly contains diamond. The production procedure of the molding die used in the embodiment will be described with reference to FIG. 6.

Figure 6A:
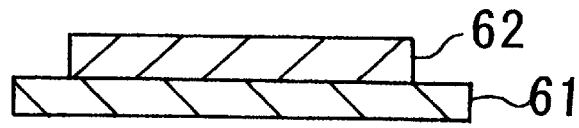
FIG. 6 is a section view showing a production procedure of a molding die which is used in Embodiment 3 of the invention and made of diamond.
Figure 6B:
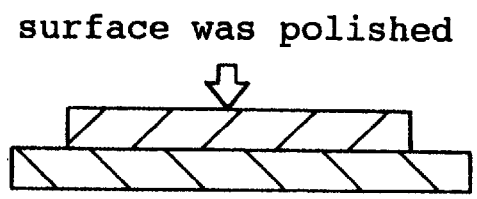
Figure 6C:
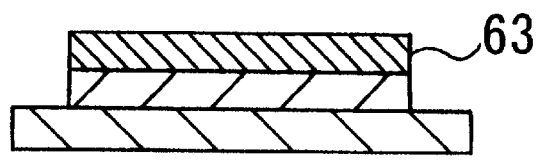
Figure 6D:
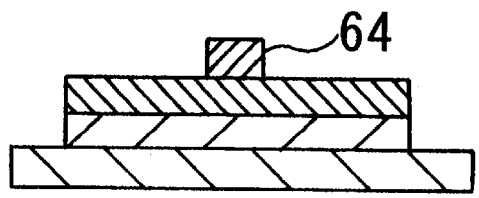
Figure 6E:
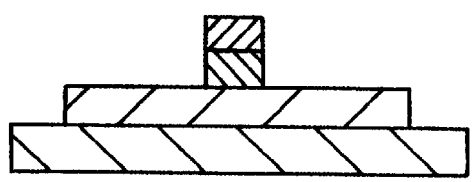
Figure 6F:
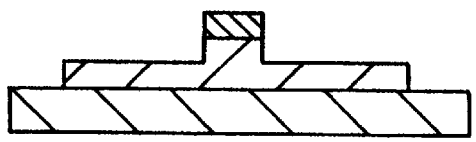
Figure 6G:
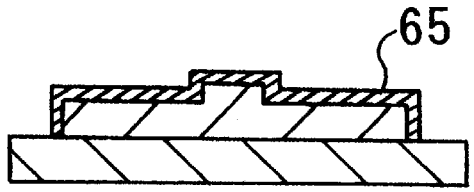

First, an Si substrate 61 was set in a vacuum apparatus (not shown), a diamond film 62 was deposited by the CVD method, and the substrate was taken out to the atmosphere after cooling (FIG. 6(a)). At this time, in order to prevent warpage or destruction of the substrate due to internal stress of the film from occurring, the Si substrate 61 preferably has a thickness of 0.5 mm or more. As the substrate material, it is not always required to use Si. Any material may be used as far as it allows a diamond film to be formed. For example, a hard metal (TiN or the like) may be used. The thickness of the diamond film 62 to be deposited depends on the depth of the core pattern groove which is to be formed. When the core pattern has a depth of about 8 $\mu$m, the diamond film must be deposited at least to a thickness of 15 $\mu$m or more.

The diamond film 62 formed by the CVD method is configured by polycrystals and has a rugged surface. Therefore, the surface was polished by using diamond powder (FIG. 6(b)). As a result, the surface roughness ($R_{MAX}$) was reduced at least to 0.05 $\mu$m or less.

After the polishing, the whole of the Si substrate 61 was again set in the vacuum apparatus, an amorphous Si film 63 was formed on the diamond film 62 by the CVD method, and the substrate was taken out to the atmosphere after cooling. The amorphous Si film 63 will serve as an etching mask in patterning of the diamond film (FIG. 6(c)). As the material of the etching mask, any material may be used as far as it is hardly etched by oxygen plasma. The material is not restricted to amorphous Si. The thickness of the amorphous Si to be formed depends on the depth of the core pattern. When the depth is about 8 $\mu$m, the amorphous Si is preferably formed at a thickness of about 1 $\mu$m.

Next, photoresist 64 was applied onto the amorphous Si film 63. After baking, exposure and development were conducted by using a photo mask having a predetermined pattern to pattern the photoresist (FIG. 6(d)). As the photoresist, a positive photoresist which is excellent in pattern accuracy is preferably used.

Next, the whole of the Si substrate 61 was set in a dry etching apparatus (not shown), and reactive ion etching (RIE) was conducted with using $CF_4$ gas as an etching gas, thereby patterning the amorphous Si film 63. In this case, the photoresist serves as an etching mask and only the amorphous Si film of the predetermined pattern remains (FIG. 6(e)). Another fluorine organic gas such as $CHF_3$ may be used as the etching gas for amorphous Si.

Next, the diamond film 62 was processed by reactive ion etching using oxygen gas. At this time, the photoresist 64 is ashed, but the amorphous Si film 63 functions as an etching mask. The diamond film 62 could be subjected to fine patterning in a relatively simple manner, so that a projection shape corresponding to the core pattern was formed (FIG. 6(*f*)). The etching gas mainly contains oxygen gas. When argon gas was adequately mixed with the etching gas, it was possible to optimize the etching rate and the pattern accuracy.

The amorphous Si film 63 was removed away by wet etching or the like, thereby completing the base member of the molding die. In order to chemically protect the base member and improve the release property with respect to a workpiece to be molded, a protective metal film 55 was formed on the diamond base material (FIG. 6(*g*)). As a result, the molding die in which diamond is used as the base material was completed.

By using the thus produced molding die of the diamond base material, the same core patterns were formed in two glass plates as described in the embodiments above. In order to produce the optical waveguide component by sticking the glass plates together with opposing the grooves to each other, core pattern grooves having rectangular section shape of a depth of 4 $\mu$m and a width of 8 $\mu$m were produced. Even after this process was repeated, no damage was observed in the die, and it was confirmed that the die has very high durability.

When diamond is used and the surface is patterned in this way, it is possible to realize a molding die which has both high mechanical strength and fine working accuracy. As the material of the die, diamond may be used in the form of a film or in the form of bulk. Alternatively, a DLC (Diamond-Like Carbon) film may be used. In the alternative, the same effects can be attained.

The molding die in which diamond or DLC is used as the base material has very high mechanical strength, and is excellent in durability as a die. Furthermore, a fine pattern having a smooth surface can be formed easily and deeply by a dry etching process. Therefore, even a core pattern which is difficult to be formed by machining can be formed simply and in mass, and hence the molding die is very effective.

The invention is directed to an optical waveguide component. A component to which the molding die described in the embodiment can be applied is not restricted to this. The die may be applied also to various optical devices having a fine pattern, such as a diffraction grating and a microoptics component.

The molding die made of diamond which has been described in the embodiment is an example of the molding dies which were used in Embodiments 1 and 2. The material of the die and the method of processing the surface of the die are not restricted to those described above.

(Embodiment 4)

Figure 7:
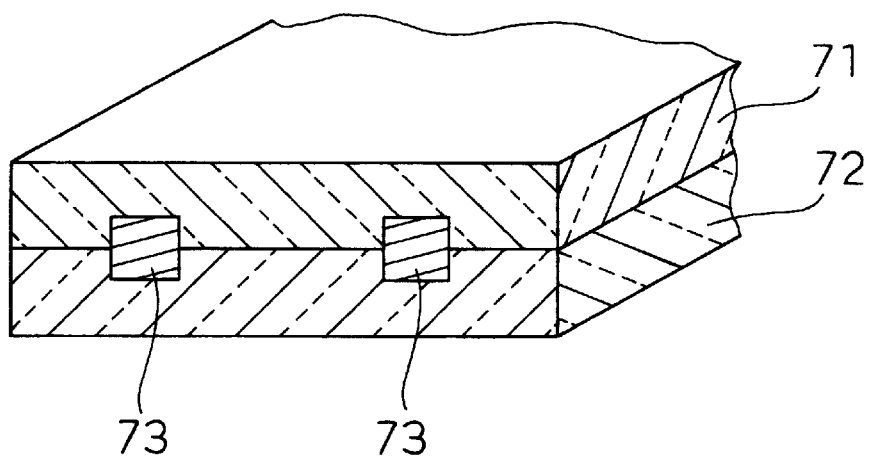
FIG. 7 is a perspective view showing the structure of an optical waveguide component of Embodiment 4 of the invention.

FIG. 7 is a view showing an embodiment of the optical waveguide component of the invention. The optical waveguide component is configured by sticking upper and lower substrates of different kinds together. As the materials of the substrates, it is preferable to use a combination of materials which have similar refractive indices and which are different in coefficient of thermal expansion. As an example of the combination, useful is a combination of borosilicate glass (#709, coefficient of thermal expansion: $65 \times 10^{-7}$/° C., refractive index for visible light: 1.522) 71 and zinc crown glass substrate (#801, coefficient of thermal expansion: $111 \times 10^{-7}$/° C., refractive index for visible light: 1.523) 72. These materials were used in the substrates, and a rigid material such as an ultraviolet curing resin was used in a core 73, thereby configuring the optical waveguide component.

Figure 8:
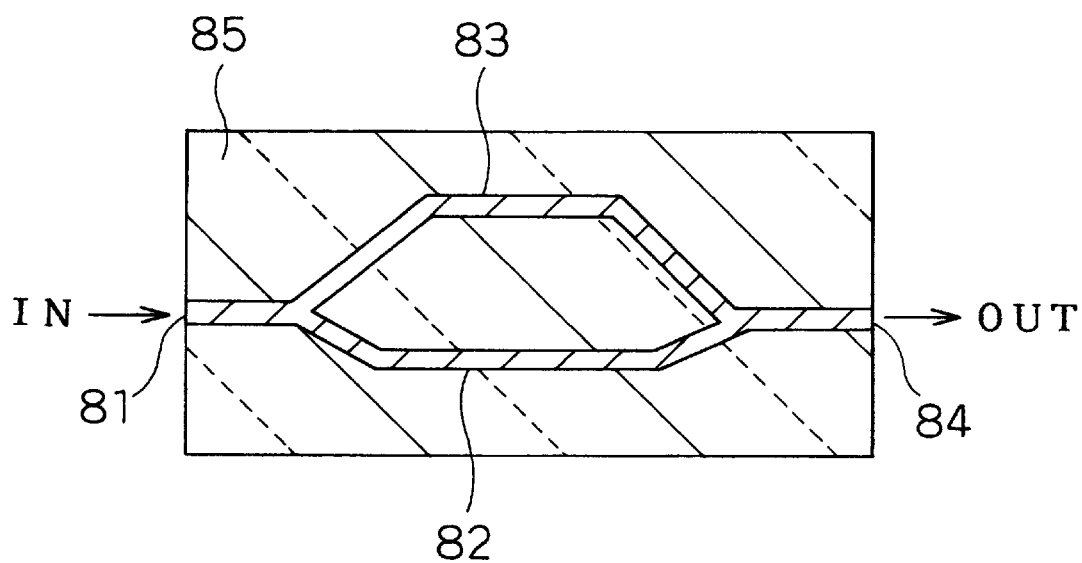
FIG. 8 is a section view of a Mach-Zehnder temperature sensor using the optical waveguide component of the configuration of FIG. 7.

The optical waveguide component of the configuration of FIG. 7 is useful as a temperature sensor. FIG. 8 shows a Mach-Zehnder interferometer configured by two arms of different lengths. Referring to FIG. 8, light enters through an input light port 81, is split into optical paths 82 and 83, and then emits through an output light port 84. In accordance with the optical path length difference $\Delta L$ between the arms 82 and 83, the output light intensity $P_T$ can be detected. The reference numeral 85 denotes a glass substrate.

Figure 9:
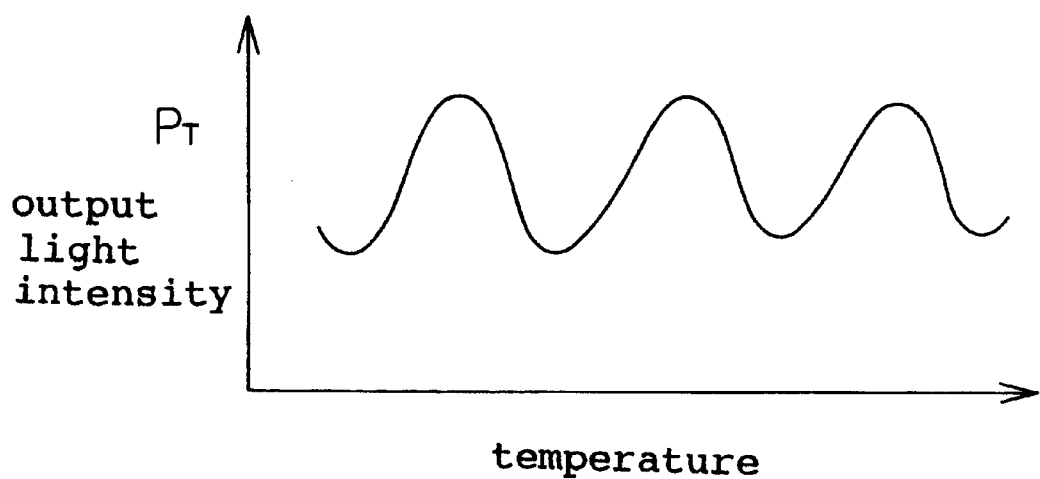
FIG. 9 is a view showing relationships between a temperature variation amount and an output light intensity.

When the ambient temperature is changed, the substrates expand or contract. Because of the difference in coefficient of thermal expansion, internal stress is generated, and birefringence is induced in the core, thereby changing the phase of the guided light. Light of the TE or TM mode was input to the interferometer of FIG. 8, and the intensity variation of output light with respect to the temperature was observed, with the result that a periodic power such as shown in FIG. 9 was obtained. In other words, when the output light was observed, it was possible to use the interferometer as a temperature sensor. In the case where the power variation with respect to the temperature is small and the sensitivity is low, the temperature dependency of the output light may be measured for both the TE and TM modes, and the difference may be observed. Alternatively, a bent waveguide may be used so that the optical path length difference between the arms is increased.

Conventionally, a temperature sensor of the waveguide type usually uses a phenomenon in which the refractive index of a waveguide is changed depending on the temperature (for example, "Optical integrated circuit," p. 402, Ohamsha Ltd.). In such a temperature sensor, the change in refractive index with respect to the temperature is small or in the order of $10^{-5}$/° C. and hence the sensitivity is hardly improved. Moreover, it is difficult to use a material such as glass which is economical but in which the change in refractive index with respect to the temperature is small.

By contrast, in the optical waveguide component of the invention, in addition to the change in refractive index of the substrate material, the optical elastic effect (an effect in which the refractive index is changed by applying a pressure) generated by the complex substrate is superimposedly employed. Even when a glass material is used, therefore, it is possible to attain temperature sensing of high sensitivity. When the production method described in Embodiment 1 was used, for example, the component could be easily produced. Namely, a temperature sensor which is economical and has high performance can be produced in mass, and the invention attains a large effect.

The materials constituting the optical waveguide component which has been described as an example in the embodiment are not restricted to those described above. The configuration of the temperature sensor is not restricted to that described above.

In this embodiment and the other embodiments described above, an example in which core pattern grooves are formed by using press molding has been described as a preferred production method. It is a matter of course that a desired optical waveguide component can be realized even when a projected core pattern is formed by using etching or machining.

What is claimed is:

1. An optical waveguide component comprising:
   a first optical member in which a predetermined first core pattern groove is formed; and
   a second optical member in which a predetermined second core pattern groove is formed,
   said first and second optical members being combined together so that said first and second core pattern grooves are opposingly overlapped with each other,
   said first and second core pattern grooves being filled with a core material,
   wherein said first and second optical members are made of glass, each of said first and second core pattern grooves has a section shape of a triangle, and said grooves are formed by use of a molding die.

2. An optical waveguide component according to claim 1, wherein a light emitting device or a light receiving device is integrated with said first optical member and said second optical member.

3. An optical waveguide component according to claim 1, wherein a positioning marker is disposed on said first or second optical member.

4. An optical waveguide component according to claim 1, wherein a recess is formed in one of said first and second optical members, and a projection having the same pattern as said recess is formed on the other member.

5. An optical waveguide component according to claim 1, wherein shapes of sections of said first and second core pattern grooves which are overlapped with each other are symmetrical with regard to the overlapped face, said sections being perpendicular to propagation direction of light in said grooves.

6. An optical waveguide component according to claim 1, wherein a maximum depth of said groove is 5.7 $\mu$m or less.

7. An optical waveguide component according to claim 1, wherein a light emitting device or a light receiving device is integrated with said first optical member.

8. An optical waveguide component according to claim 1, wherein a light emitting device or a light receiving device is integrated with said second optical member.

9. An optical waveguide component comprising:
   a first optical member in which a predetermined first core pattern groove is formed; and
   a second optical member in which a predetermined second core pattern groove is formed,
   said first and second optical members being combined together so that said first and second core pattern grooves are opposingly overlapped with each other,
   said first and second core pattern grooves being filled with a core material
   wherein a difference in coefficient of thermal expansion between said first and second optical members is at least $30 \times 10^{-7}/°$ C. or more.

10. An optical waveguide component comprising:
    a first optical member in which a predetermined first core pattern groove is formed; and
    a second optical member in which a predetermined second core pattern groove is formed,
    said first and second optical members being combined together so that said first and second core pattern grooves are opposingly overlapped with each other,
    said first and second core pattern grooves being filled with a core material,
    wherein bonding faces of said first and second optical members in which said core pattern groove is formed do not perpendicularly intersect with side faces of said optical members, said side faces being at an outlet or at an inlet of said core pattern groove.

* * * * *